June 16, 1964 E. C. OBERSTAR 3,137,558
GLASS BENDING APPARATUS
Filed Sept. 11, 1958 2 Sheets-Sheet 1
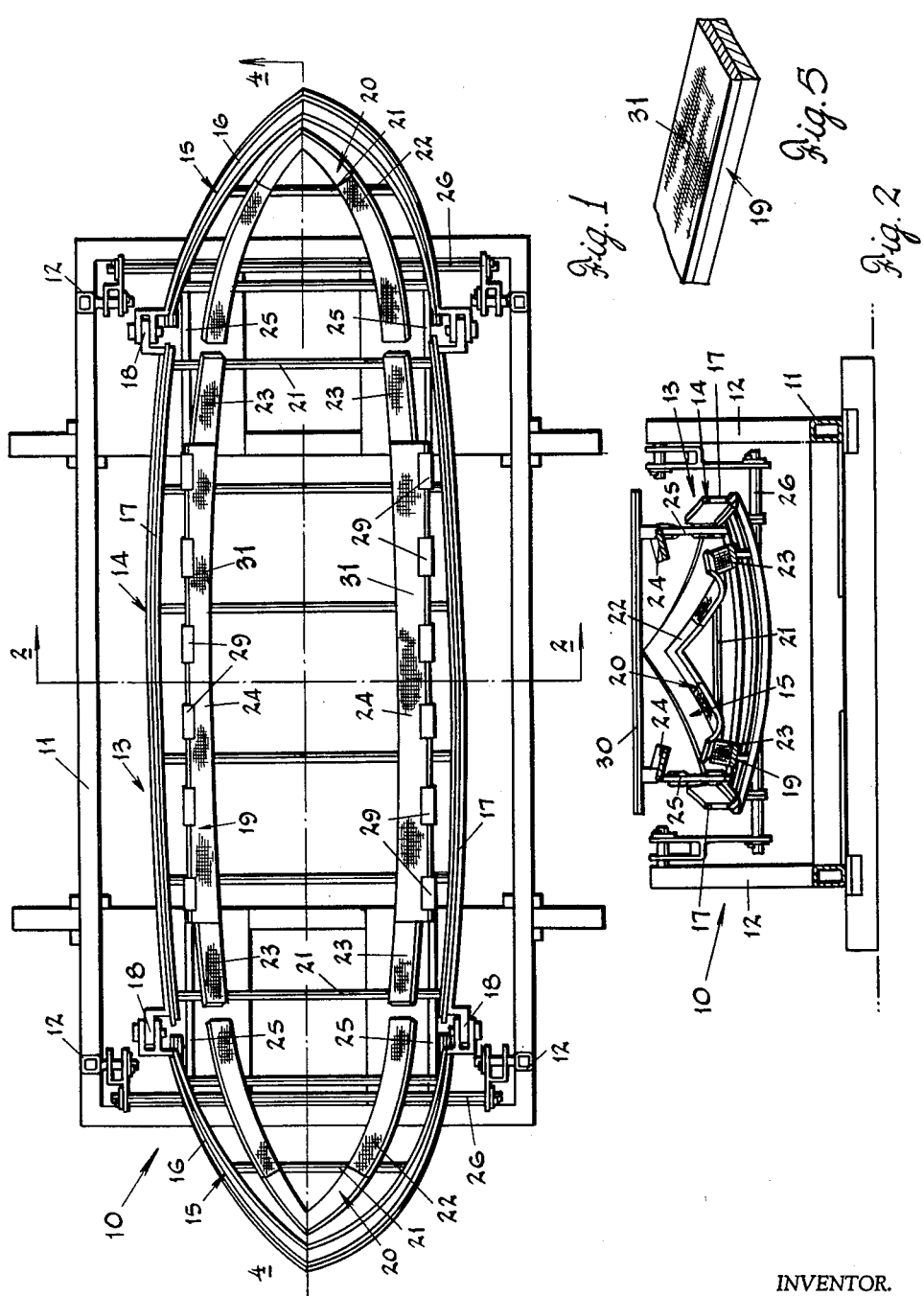
INVENTOR.
Edward C. Oberstar
BY
Nobbe & Swope
ATTORNEYS June 16, 1964 E. C. OBERSTAR 3,137,558
GLASS BENDING APPARATUS
Filed Sept. 11, 1958 2 Sheets-Sheet 2
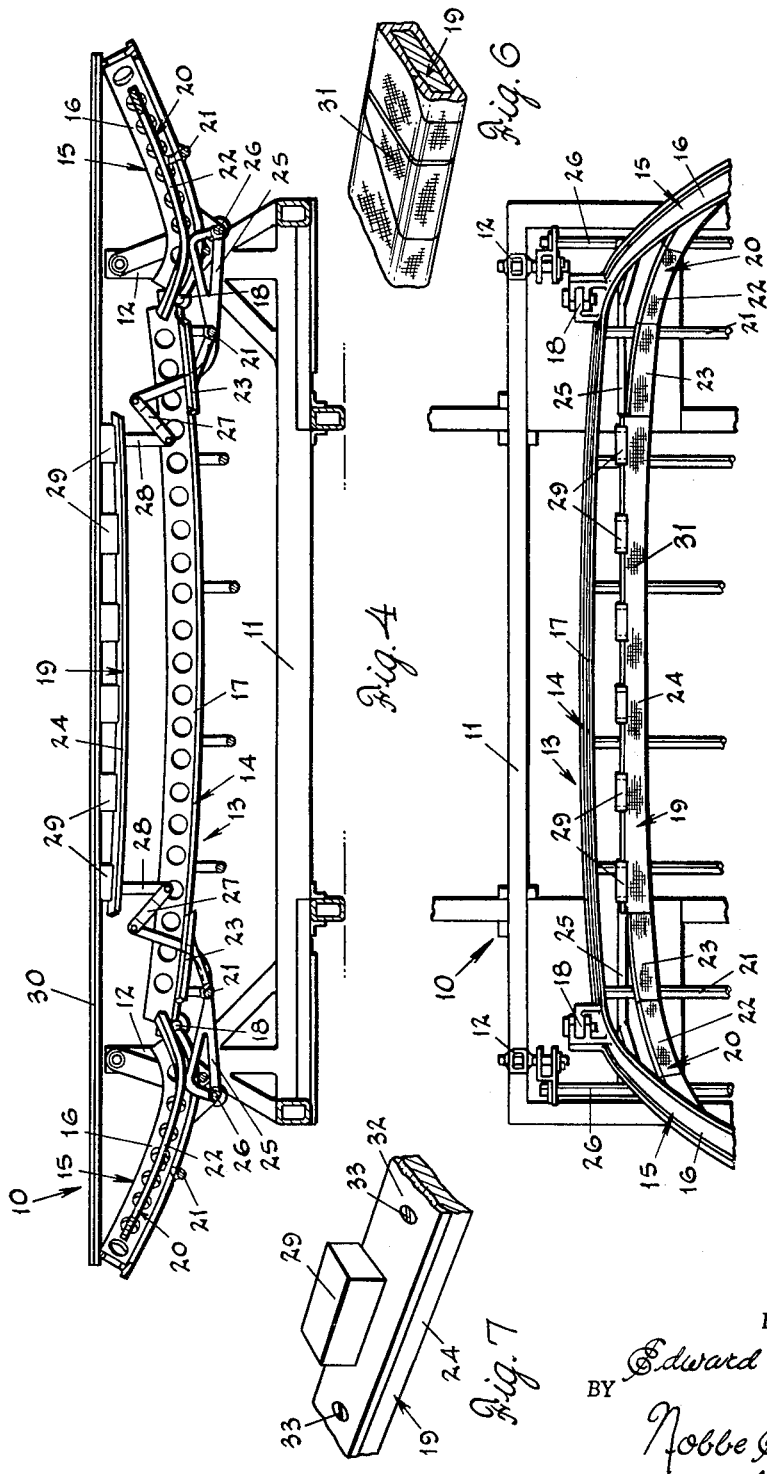
INVENTOR.
Edward C. Oberstar
BY Nobbe & Swope
ATTORNEYS 3,137,558
GLASS BENDING APPARATUS
Edward C. Oberstar, Ottawa, Ill., assignor to Libbey-Owens-Ford Glass Company, Toledo, Ohio, a corporation of Ohio
Filed Sept. 11, 1958, Ser. No. 760,430
5 Claims. (Cl. 65—288)

The present invention relates generally to apparatus for bending glass sheets or plates, and more particularly to an improved bending mold.

In the bending of glass sheets to form bent sheets having their peripheral edges in compression, thus providing a more shock resistant sheet, there have been two generally accepted types of bending molds used. One of these molds, upon which a pattern cut sheet is bent, is provided with a shaping rail or surface of such a size that when the glass sheet is bent into conformity therewith the marginal periphery of the sheet overhangs the rail and therefore cools without being materially affected by the residual heat within the rail and thus sets in compression.

In the other type of mold, which is used for bending blank or block size glass sheets which are cut to pattern outline after being bent, the shaping rail is substantially rectangular in plan view and a heat retaining member or strain bar having its periphery contoured to the desired outline for the pattern cut sheet, but somewhat smaller as compared thereto, is located within the confines of the shaping rail and spaced downwardly therefrom. After the glass sheet is bent into contact with the shaping rail, and while the mold is passing through the furnace annealing zone, the residual heat within the heat retaining member prevents the portion of the sheet thereabove from cooling at the same rate as intermediate portions of the sheet outwardly therefrom between the periphery of the strain bar and the shaping rail which causes the intermediate sheet portions to set in compression. In cutting a sheet bent in such a manner to form a patterned sheet, the scoring tool is moved over the glass along a path through the sheet portion set in compression so that the resultant pattern cut sheet will have its peripheral edge in compression.

The heat retaining member may contain a relatively large amount of metal for adequate structural support and it is desirable to insulate this member to prevent an excessive amount of heat from being absorbed thereby. Also the heat retaining member will retain the absorbed heat longer when the mold is passed through the annealing zone if this member is insulated.

Another important reason for selectively insulating the heat retaining member is that the mold may be used in different bending furnaces having different heating characteristics. Thus, a mold which produces a desired stress pattern in one furnace may require alteration of the heat retaining member when used with a second furnace.

Various insulated strain means have been utilized in the past such as painted or coated metallic members and while such means produced satisfactory strain patterns in the glass sheets the structure of these members could not be selectively altered to permit the molds to be used in different furnaces. Moreover, the stress pattern of the glass sheets could not be readily changed.

In accordance with the present invention, there is provided a glass bending mold that will produce a bent glass sheet having a desirable stress pattern therein, and which has a heat retaining member that may be selectively insulated.

It is therefore an important object of the invention to provide a novel and improved bending mold for bending glass sheets and particularly sheets in which the stress pattern may be altered.

Another object of the invention is to provide an improved glass bending mold adapted to form a desired stress pattern in the sheet and to be used with a plurality of bending furnaces.

A further object of the invention is to provide a glass bending mold adapted to selectively form a desired stress pattern in the glass sheet and to support the sheet intermediate the ends thereof.

Other objects and advantages of the invention will become more apparent during the course of the following description when taken in connection with the accompanying drawings.

In the drawings, wherein like numerals are employed to designate like parts throughout the same:

FIG. 1 is a plan view of an improved bending mold provided by the present invention in the open position;

FIG. 2 is a transverse section taken along line 2—2 of FIG. 1;

FIG. 3 is a fragmentary plan view of the improved bending mold provided by the present invention in the closed position;

FIG. 4 is a longitudinal section taken along line 4—4 of FIG. 1;

FIG. 5 is an enlarged fragmentary perspective view of the preferred embodiment of the insulated stress forming member of the invention;

FIG. 6 is an enlarged fragmentary perspective view of a modified embodiment of the insulated stress forming member of the invention; and FIG. 7 is an enlarged fragmentary perspective view of another modified embodiment of the insulated stress forming member of the invention.

With reference now to the drawings and particularly to FIGS. 1 to 4 there is shown a glass bending apparatus 10 constructed in accordance with the invention and comprising a substantially rectangular rack or support frame 11 having vertical support posts 12 extending upwardly from each of the four corners thereof for pivotally supporting the bending mold proper. This mold 13 is of the skeleton type and includes a center section 14 and a pair of oppositely disposed movable end sections 15 immediately adjacent the opposite ends of the center section 14 and forming substantially continuations thereof.

Each of the mold end sections 15 comprises a substantially triangular or V-shaped shaping rail 16 formed as an inverted T and having a relatively narrow upper surface for receiving the bent glass sheet in contact therewith. The center mold section 14 comprises a pair of spaced, substantially straight parallel shaping rails 17 having a relatively shallow curvature and of the same configuration aligned with the innermost ends of the substantially V-shaped end section rails 16 and preferably connected thereto by hinges 18.

Carried within the confines of the shaping rail sections forming the mold center section and mold end sections is a heat retaining member in the form of a strain bar 19 of substantially greater width than the relatively narrow upper surface of the respective shaping rail. The strain bar 19 is normally disposed below the sheet contacting surfaces of the shaping rails and has its outermost edges shaped to conform to the outline of the pattern to be cut from the bent sheet but somewhat smaller.

As best shown in FIGS. 1 and 2 the strain bar 19 comprises a triangular or substantially V-shaped end section 20, referred to as diverging arms in relation to the intermediate heat absorbing means, rigidly secured to each triangular shaped end rail section 16 by transverse rods 21 or in some other suitable manner. As shown in FIG. 1 each of the end sections 20 has its upper relatively wide surface 22 spaced from the mold shaping surface a substantially equal distance throughout its entire length and also has the upper surface 22 contoured to a configuration which is substantially identical with the end section shaping rails 16.

The portion of the strain bar 19 carried by the mold center section 14 includes a pair of fixed spaced substantially parallel portions 23 and intermediate movable substantially parallel portions 24. The fixed portions 23 are located beneath the shaping rails 17 at the opposite ends thereof and are carried by rods 21 which extend between the shaping rails. The relatively wide or flat upper surface of the fixed portions are contoured to conform to the shaping surface of the center section rail 17. Each center or intermediate portion 24 is supported for movement from an elevated position wherein a flat glass sheet is placed on the mold to a lowered position when the sheet is bent, which lowered position places the intermediate portions in alignment with the fixed spaced portions 23 to form substantially continuations thereof.

As shown in FIG. 4 the adjacent ends of the respective strain bar sections 23 and 24 are bevelled in such a manner as to provide a substantially continuous strain bar when the mold is closed. To support the elongated intermediate or center bar portion 24 for movement from the elevated to the lowered position there is provided a pair of curved elongated arms 25 having their outermost ends secured to the transversely extending pivot rods 26 of the end section 15 which are swingably carried by the corner posts 12 and their innermost ends pivotally carrying downwardly disposed links 27 having their lowermost ends pivotally secured to rods 28 depending from the opposite ends of the bar section 24. When the mold is in the open position the various parts assume the position shown in FIGS. 1, 2 and 4 and when the mold moves from the open to the closed position the various parts assume the position shown in FIG. 3. When the mold sections move from the open to the closed position the arms 25 are rotated downwardly thus carrying the intermediate bar sections 24 therewith and into alignment with the strain bar sections 23.

Carried by the intermediate bar sections 24 are a plurality of sheet support blocks 29 preferably formed of a refractory material which will not fuse to the glass sheet. As shown in FIG. 4 the support blocks 29 adjacent the center of the intermediate bar section 24 have a greater height as compared to the blocks 29 carried at the opposite ends of the intermediate bar section 24 so that the upper surface of the plurality of blocks lie in a horizontal support plane which is defined by the upper surfaces of the triangular shaping rail sections 16 at the apices thereof. Thus when the mold is in the position of FIG. 4 the glass sheet or sheets 30 are supported at their opposite ends upon the rail sections 16 and intermediate their ends upon the plurality of blocks 29.

As shown in FIGS. 1 and 3 the blocks 29 are secured to the edges of the bar sections 24 toward the shaping rails 17 when in their mounted position upon the bar sections 24. Due to this arrangement the intermediate bar sections 24 present an unbroken width substantially equal in width to the fixed sections 23 exposed to the glass sheet as shown in FIG. 1. There is thus presented to the undersurface of the glass sheet a substantially continuous strain bar of substantially equal width along its entire closed length and thus as will be later set forth a stress pattern is formed in the glass sheet 30 through the action of the strain bar.

As will be seen in FIG. 1, the movable sections 24 of the strain bar 19 are relatively wider than fixed sections 20 and 23 and project outwardly thereof toward the shaping rails. The blocks 29 are fitted over the outer projecting edges of the bar sections and for this purpose the blocks are provided with slots in which the bar sections are received. If desired the bar sections 24 may be notched along the edges toward the rails 17 to prevent movement of the blocks 29 along the bar sections in a direction which is substantially parallel to the longitudinal axis of the mold 13.

According to the present invention the strain bar 19 is covered with a flexible insulating material 31 such as fibrous glass cloth in the regions shown most clearly in FIG. 1 to selectively control the amount of heat absorbed by the strain bar. Exceptionally good results have been obtained when a layer of fibrous glass cloth tape between about .015 inch and .035 inch thick is secured by suitable adhesive material or clamps to the upper surface of the strain bar 19 as shown in FIG. 5.

It has been found that the best strain pattern is obtained when all portions of the strain bar 19 carried by the mold center section 14, including the fixed portions 23 and movable portions 24, are covered by the insulating material 31 as well as those portions of the V-shaped end section 20 which are adjacent the mold center section. Those portions of the V-shaped end section 20 which are located at the apex are preferably not insulated because more heat is required by the strain bar 19 in these areas to produce the proper stress patterns in the sheet 30.

The strain pattern in the glass sheet 30 is improved in those areas which lie adjacent the insulated regions of the strain bar 19 because the insulating material 31 not only prevents the strain bar 19 from becoming excessively heated but also causes the absorbed heat to be retained longer as the mold apparatus 10 is passed through the annealing zone of a furnace. While the fibrous glass cloth is preferably secured to the top surface the strain bar 19 as shown in FIG. 5 in order to uniformly insulate the surface which faces the glass sheets 30, the glass cloth may be completely wrapped around the relatively wide end sections 20 as well as the fixed portions 23 and movable portions 24 of the bar 19 as shown in FIG. 6. In the latter embodiment the bar 19 absorbs even less heat from the bending furnace.

Still another embodiment of the invention is shown in FIG. 7 wherein a substantially rigid sheet of insulating material 32 is carried by the intermediate movable portion 24 of the strain bar 19. This sheet may be of asbestos material which has been cut to the configuration of the strain bar and is preferably secured to the strain bar by means of suitable bolts 33. In order to obtain a uniform stress pattern adjacent the sheet support blocks 29 which are also made from an insulating material the insulating sheets 32 are suitably notched to receive the blocks 29 and thereby present a more uniformly heated surface to the underside of the sheet 30 as the mold 13 passes through the furnace annealing zone.

In bending a glass sheet or pair of sheets upon the novel mold of the present invention the mold sections are swung to the open position of FIGS. 1, 2 and 4 and a sheet placed upon the mold. During the bending of the sheet and while the sections are moving from the open to the closed position of FIG. 3 the arms 25 lower the intermediate bars 24 downwardly thus lowering the central portion of the sheet 30 and depositing said sheet onto the center mold section. During the remaining small increment of closing movement the blocks 29 are lowered below the shaping surface of the center section shaping rails 17 while the intermediate bars 24 are carried into contact and alignment with the stationary bars 23.

After the sheet has been bent and is being annealed the residual heat remaining in the shaping rail sections and the strain bar 19 causes the portion of the glass sheet immediately thereabove to cool at a decreased rate as compared to an intermediate sheet portion therebetween thus setting the enclosed sheet portion in compression. After the block size sheet has been cooled it is removed from the mold and cut along a surface line between the shaping rail sections and the strain bars through the area of the glass sheet set in compression thus providing a pattern cut sheet having its peripheral edge in compression which is more shock resistant.

From the description of the improved bending mold of the present invention it will be apparent that not only is there provided apparatus for supporting a glass sheet intermediate its ends but also apparatus for producing the desired stress pattern in the glass sheet, both of such objects being accomplished with a minimum amount of metal in the mold that is in close proximity to the glass thus minimizing the formation of undesirable stress patterns in the sheet.

It is to be understood that the forms of the invention herewith shown and described is to be taken as a preferred embodiment of the same, and that various changes may be resorted to without departing from the spirit of the invention or the scope of the subjoined claims.

I claim:

1. A glass sheet bending mold of skeleton outline comprising a peripheral rail having an upper edge conforming to an outline shaping surface, a heat absorbing member located in spaced relation below said upper edge and positioned within a plane projected by said peripheral rail to face a portion of a glass sheet mounted on said mold for bending, and a sheet of asbestos superimposed on said heat absorbing member, the area of said sheet of asbestos being less than the area of said heat absorbing member so that an uncovered portion of the heat absorbing member faces part of said glass sheet portion and the sheet of asbestos faces another part of said glass sheet portion.

2. A glass sheet bending mold of skeleton outline comprising a peripheral rail having an upper edge conforming to an outline shaping surface, a heat absorbing member located in spaced relation to said mold and positioned within a plane projected by said peripheral rail to face a portion of a glass sheet mounted thereon for bending, said member comprising a pair of substantially parallel bars forming a movable intermediate portion of the member and portions having diverging arms aligned with said bars, said arms being interconnected with the mold adjacent each end of said intermediate bars, means for elevating said intermediate bars to a position above the mold, means mounted on said intermediate bars for supporting the glass sheet above and in spaced relation to said heat absorbing member when said bars are in elevated relation to said mold, and insulating means superimposed on said heat absorbing member, the area of said insulating means on said arms being less than that on said bars.

3. In apparatus for bending glass sheets and producing a substantially uniform stress pattern therein as claimed in claim 2, wherein the insulating material is a layer of fibrous glass cloth wrapped completely around the said areas of the heat retaining member.

4. A glass sheet bending mold of skeleton outline comprising a peripheral rail having an upper edge conforming to an outline shaping surface, a heat absorbing member located in spaced relation to said mold and positioned within a plane projected by said peripheral rail to face a portion of a glass sheet mounted thereon for bending, said member comprising a pair of substantially parallel bars forming a movable intermediate portion of the member and portions having diverging arms aligned with said bars, said arms being interconnected with the mold at each end of said intermediate bars, means for elevating said intermediate bars to a position above the mold, means mounted on said intermediate bars for supporting the glass sheet above and in spaced relation to said heat absorbing member when said bars are in elevated relation to said mold, and insulating means superimposed on substantially all of said intermediate bars and portions only of said diverging arms so that an uncovered portion of said diverging arms faces part of said glass sheet portion and said insulating means faces another part of said glass sheet portion.

5. A glass sheet bending mold of skeleton outline comprising a pair of substantially parallel intermediate rails and movable portions having diverging arms aligned with and interconnected to said rails, said rails and said arms having shaping surfaces adapted to impart curvature to the glass sheet, heat absorbing means located in spaced relation to said mold and positioned within the skeleton outline of the mold to face a portion of a glass sheet mounted thereon for bending, said heat absorbing means comprising a pair of substantially parallel bars forming an intermediate portion and other portions mounted on the arms of said movable portions, said other portions being contoured to conform to the configuration of said movable portions, said intermediate bars having relatively wide surfaces, and insulating means superimposed on substantially all of said wide surfaces and on a limited area only of said other portions of said heat absorbing means adjacent said intermediate bars so that an uncovered portion of the heat absorbing means faces part of said glass sheet portion and said insulating means faces another part of said glass sheet portion.

References Cited in the file of this patent

UNITED STATES PATENTS

| | | |
|---|---|---|
| 2,348,278 | Boyles et al. | May 9, 1944 |
| 2,526,359 | Jendrisak | Oct. 17, 1950 |
| 2,720,729 | Rugg | Oct. 18, 1955 |
| 2,729,032 | White | Jan. 3, 1956 |

FOREIGN PATENTS

| | | |
|---|---|---|
| 1,097,088 | France | Feb. 9, 1955 |
| 1,128,601 | France | Aug. 27, 1956 |
| 764,448 | Great Britain | Dec. 28, 1956 |